United States Patent Office 3,705,812
Patented Dec. 12, 1972

3,705,812
PROCESS FOR MAKING A FRIED ONION PRODUCT
John Bickford Shields, Blackfoot, Idaho, assignor to American Potato Company, San Francisco, Calif.
No Drawing. Filed July 16, 1969, Ser. No. 842,371
Int. Cl. A23l 1/12
U.S. Cl. 99—100 P                      7 Claims

ABSTRACT OF THE DISCLOSURE

This invention relates to a new fried onion product and the process for its production. Recognizable pieces of dehydrated onion are blended with flavorings and inert starchy food substances or other binders. The blend is then mixed with edible liquid to form an extrudable dough which is shaped to the desired form, such as a stick or ring, and then fried in deep fat. The end fried onion product has novel texture and flavor attributes.

FIELD OF THE INVENTION

The invention relates to a process for producing a fried onion product by producing a dough consisting of partially rehydrated dehydrated onion pieces bound together by edible binders, formed and fried.

DESCRIPTION OF THE PRIOR ART

In U.S. Pat. 3,078,172 raw onion rings were coated with flour and then dipped into a batter of milk, eggs and seasoning. They were then coated with colored flour and immersed 5 seconds in edible liquid fat at 120 degrees F. after which they were stored at −5 degrees F. The frozen onions were then cooked for 20 minutes in an oven at 425 degrees F. to prepare for eating. This product would be comparable to a conventional onion ring made from frozen onions.

In U.S. Pat. 3,114,639, 100 parts of finely chopped raw celery are mixed with 90 parts of a 4% Methocel solution and 10 parts starch or flour. This mix is extruded into hot fat to form a celery flavored product. This may be done with any raw vegetable. The moisture content of the extruded mix, if onion were used as the vegetable, would be about 88%.

In U.S. Pat. 3,361,573, a vegetable flavored synthetic potato chip is made by forming a dough, the dried ingredients of which are 1% by volume of a dried chopped flavoring vegetable. In the latter two patents very small amounts of vegetables are added as flavoring agents only.

Fried onion rings have achieved high acceptance by the American consumer. Originally, onion rings were made by the housewife from batter dipped raw onion rings which were fried in deep fat. More recently, canned and frozen products which needed to be heated or finish fried have been offered on the market. U.S. Pat. 3,078,172 is an example. Unfortunately, in many instances, the consumer has found that these convenient forms of onion rings fall far short of anticipation. There are logical reasons for this. Only the large outer rings of large onions are considered the proper size. Large onions are usually low solids content and mild flavored. Freezing of onion results in a large loss of potential onion flavor. As a result, one is often served attractive onion rings which are devoid of onion flavor. Secondly, the batter coating is extremely fragile after the coated ring is fried and often breaks away from the onion ring. If the batter formula is made tough enough to withstand handling, the finish fried product does not have the desired crisp airy texture. Since onion flesh of large onions is normally more than 90% water, freshly fried rings are crisp on the exterior while still very high in moisture in the interior of the ring. If not consumed promptly, the natural transfer of moisture toward the outside of the piece results in a soggy unacceptable product even if held under a heat lamp during this time. Fried onion rings are considered in a class of gourmet foods because of economic factors involved in their preparation. A primary consideration is the fact that only the large diameter outer rings are acceptable, and at least 50% of the prepared raw onion weight cannot be utilized for rings. Secondly, large onions do not store well and are available freshly harvested only a few months a year in any area. Large production losses are normal due to sprouting, decay, and other storage deterioration.

My invention discloses a new product and process for its manufacture which solves the many problems encountered in the production of prior art products. The onion flavor comes from distinct pieces of dehydrated onion. This ingredient is stable in normal storage; utilizes the entire onion flesh; is made from pungent varieties processed at the peak of maturity; and does not require frozen storage. The dried onion pieces are blended with dry starchy food substances or other binders and flavorings. This is formed into a dough; shaped; and fried. The fried product is homogeneous in the sense that there is no distinct inner or fragile outer portions of different composition. The moisture content of the dough is much less than that of a batter dipped raw onion and consequently can be fried to completion in a much shorter time. Since there is never a soggy high moisture center, the product retains its crispness much longer than prior art products after frying and before eating. This is extremely important in mass feeding applications. By the use of dehydrated onion pieces, additional advantages will be apparent later in the disclosure.

SUMMARY OF THE INVENTION

The invention is a new onion product which comprises distinct pieces of dehydrated onion which are partially reconstituted with an edible liquid in the presence of mildly flavored starchy food substances or other binders with flavorings to make a dough which can be shaped and then fried in hot fat to produce a fried onion product with the following advantages over prior art products:

(1) Onion solids of the mix can be varied to produce a product of desired onion strength. Onion solids and flavor far in excess of that resulting from the use of 100% raw onions can be obtained. In the dehydration of onions, about 90% of the raw weight is removed as water. By using dehydrated onion pieces as a major ingredient, only a portion of the water removed by dehydration needs to be added to form a workable dough.

(2) The product is relatively homogeneous and does not contain fragile crusts.

(3) The moisture content of the dough is regulated far below that of raw onions so that the fried product does not have soggy centers when the exterior is properly fried.

(4) The product can be held after frying without becoming limp or soggy.

(5) Flavorings can be uniformly distributed throughout the product instead of being concentrated on the surface.

(6) The product can be made in any desired size or shape and is not limited by the natural ring construction of onions.

(7) The product has firm textured onion bite and is accepted as an onion product—not an onion flavored product.

DESCRIPTION OF THE PREFERRED EMBODIMENTS

A series of tests was conducted in which the percentage of dehydrated onion pieces in the dry mix was varied. The purpose was to determine the amount necessary to result in an accepted onion product rather than an onion flavored product and to determine the onion level preferred by our panel. Doughs were made from the following mixes; formed; and deep fat fried.

| Dry ingredients | Percent | | |
|---|---|---|---|
| | Sample 1 | Sample 2 | Sample 3 |
| Chopped onion | 9.1 | 20.0 | 25.1 |
| Potato granules | 87.3 | 76.4 | 71.3 |
| Salt | 1.8 | 1.8 | 1.8 |
| Guar gum | 1.8 | 1.8 | 1.8 |
| Total | 100 | 100 | 100 |

Sample No. 1 was judged to have too few onion pieces and bite to be considered an onion product. Sample No. 2 was judged to have very good flavor and texture. Sample No. 3 was judged excellent in texture and flavor and was preferred over a product made from raw onion. In general, it has been found that where the dry formulation contains 10% or less of dehydrated onion pieces, the panel eating the above product thought of it as a French fry containing onion pieces.

It has been found that when the dry formulation contains 15% or more dehydrated onion pieces, the panel eating the fried pieces refer to them as onion sticks or rings. Further, it has bene found that the optimum range of onion content in the dry formulation seems to be from 20% to 40% dehydrated onion pieces by weight in the dry formulation. Conversely, the maximum level of binder used with this product is limited only by the ability of the product to make a dough that can be formed and fried in a single unitary piece.

Another series of tests was run to determine the significance of the particle size of the dehydrated onion used in the standard formula. Lots were produced using three sizes of commercial dehydrated onion at a level of 18.6% by weight of the dry mix as onion.

| | Type of dried onion used | Dried onion mesh size |
|---|---|---|
| Sample No.: | | |
| 4 | Special chopped | −5–10 |
| 5 | Minced onion | −10–20 |
| 6 | Ground onion | −20–40 |

Sample No. 6 was judged to have a strong onion flavor but no bite. Onion particles were not noticeable in the fried product.

Sample No. 5 was judged to have very good flavor and texture. Onion pieces were evident and this product was considered an onion product, however the panel consensus was that pieces any smaller would not be acceptable.

Sample No. 4 was also judged to have excellent flavor and bite. The onion pieces were quite evident and the product was considered an onion product.

The tests indicated that discernible pieces of onion were required and that the pieces before the addition of liquid should be larger than 20 mesh. Although any size larger than 20 mesh was rated good, further tests showed that dried onion pieces larger than 5 mesh or long pieces caused problems when the dough was extruded through dies of about ¼–5/16″ diameter. Further tests using ground potato flakes to substitute for part of the potato granules and using dried sweet dairy whey at a concentration of 1.6–8.3% by weight of the dried mix were equally acceptable when the moisture and guar gum levels were adjusted to get a dough of the desired handling qualities.

A typical process yielding the desired end product follows:

A uniform dry mix was made of the following ingredients:

| | Grams | Percent |
|---|---|---|
| Dehydrated minced onion | 70 | 25.1 |
| Potato granules | 152 | 54.5 |
| Potato flakes (ground) | 40 | 14.3 |
| Dried sweet dairy whey | 10 | 3.8 |
| Salt | 3.2 | 1.15 |
| Guar gum | 3.2 | 1.15 |
| Total | 278.4 | 100.0 |

The dry ingredients were mixed until uniform. 500 ml. water at 70 degrees F. was added and the blend was mixed to a uniform dough. The dough was allowed to stand at least 5 minutes. The dough was then extruded through a 5/16″ square die and cut to about 4″ lengths. The extruded dough sticks were deep fat fried for 60 seconds at 350 degrees–360 degrees F. The fried product was judged excellent in onion flavor, texture, and bite. The firm textured bite and the unique release of onion flavor noted during chewing was strongly preferred over regular fried onion rings which have an undesirable mushy texture and mouth feel.

It is important to note that the process of this invention can be used for producing a product having a higher onion solid content than can be achieved by using onions in their natural state. Typically onions have a high moisture content and a low solid content. Unfortunately, as the solid content declines, the flavor of the onion correspondingly declines. In the present process onions can be dehydrated to a reduced weight. Thereafter, the dehydrated onion particle can be mixed with binder of dry weight less than that of the weight of the moisture removed. This effectively concentrates the dehydrated onion in the finished product. This concentration results in a pungent onion product having an onion taste obtainable far exceeding that achievable in the natural state.

Although the disclosed examples are our preferred formulations, they are not meant to be limiting. It will be obvious to one skilled in the art that other food ingredients, leavening agents or flavors could be readily incorporated or that other moisture activatable dry binders such as neutral starchy products could be used to provide comparable body and binding of the onion pieces into shaped forms. It will also be obvious that the dough can be formed equally well as rings, rods, or other forms in various shapes and sizes as desired. It is also obvious that the dry onion ingredient may be mixed initially with part or all of the liquid before the other dry ingredients are added to form the dough. Although our tests showed no significant difference in texture or mouth feel due to this method of rehydration of the onion, more or less water can be incorporated into the dried onion pieces by varying the order of addition.

What is claimed is:

1. A process for producing a relatively homogeneous fried onion product, comprising: providing distinct dehydrated onion pieces having a minimum dimension large enough to prevent their passage through a 20 mesh screen but small enough to allow substantially all of them to pass through a 5 mesh screen; blending said onion pieces with a mildly flavored starchy food substance selected from potato granules, potato flakes and mixtures thereof, the amount of dehydrated onion pieces being at least 15% based on the total weight of onion pieces and starchy food substances; mixing said onion pieces and food substances with water in an amount equivalent to a portion of the weight of water removed in dehydrating said onion pieces to form a workable dough; shaping said dough; and frying said dough as shaped to produce a fried onion product with firm, textured, non-mushy bite and mouth feel.

2. A process in accordance with claim 1 wherein said dough is shaped by extrusion.

3. A process in accordance with claim 1 wherein said starchy food substance comprises dehydrated potato granules.

4. A process in accordance with claim 1 and further characterized by the step of blending guar gum with said onion pieces and starchy food substance.

5. A process in accordance with claim 1 and further characterized by partial rehydrating said dehydrated onion pieces prior to blending with said starchy food substances.

6. A process in accordance with claim 1 wherein said dehydrated onion pieces comprise between 20% and 40% by weight of the total weight of said onion pieces and starchy food substances.

7. A process in accordance with claim 1 wherein said dehydrated onion is chopped onion.

References Cited

UNITED STATES PATENTS

| | | | |
|---|---|---|---|
| 3,539,356 | 11/1970 | Benson | 99—100 |
| 3,540,890 | 11/1970 | Benson | 99—83 |
| 3,468,673 | 9/1969 | Keller | 99—100 |
| 3,114,639 | 12/1963 | Rivoche | 99—100 |
| 3,282,701 | 11/1966 | Wong | 99—100 |
| 3,282,704 | 11/1966 | Fritzberg | 99—207 |
| 3,361,573 | 1/1968 | Reinertsen | 99—100 |
| 3,378,380 | 4/1968 | Yamamoto | 99—204 |

OTHER REFERENCES

Food Dehydration, vol. II., Products & Technology, Van Arsdel, Air Publishing Co., Inc., 1964, Conn., pp. 272–273.

NORMAN YUDKOFF, Primary Examiner

M. G. MULLEN, Assistant Examiner